Oct. 11, 1955     J. E. STOTT     2,720,215
LEVER ARM ASSEMBLY FOR FLOAT VALVES AND THE LIKE
Filed June 22, 1950
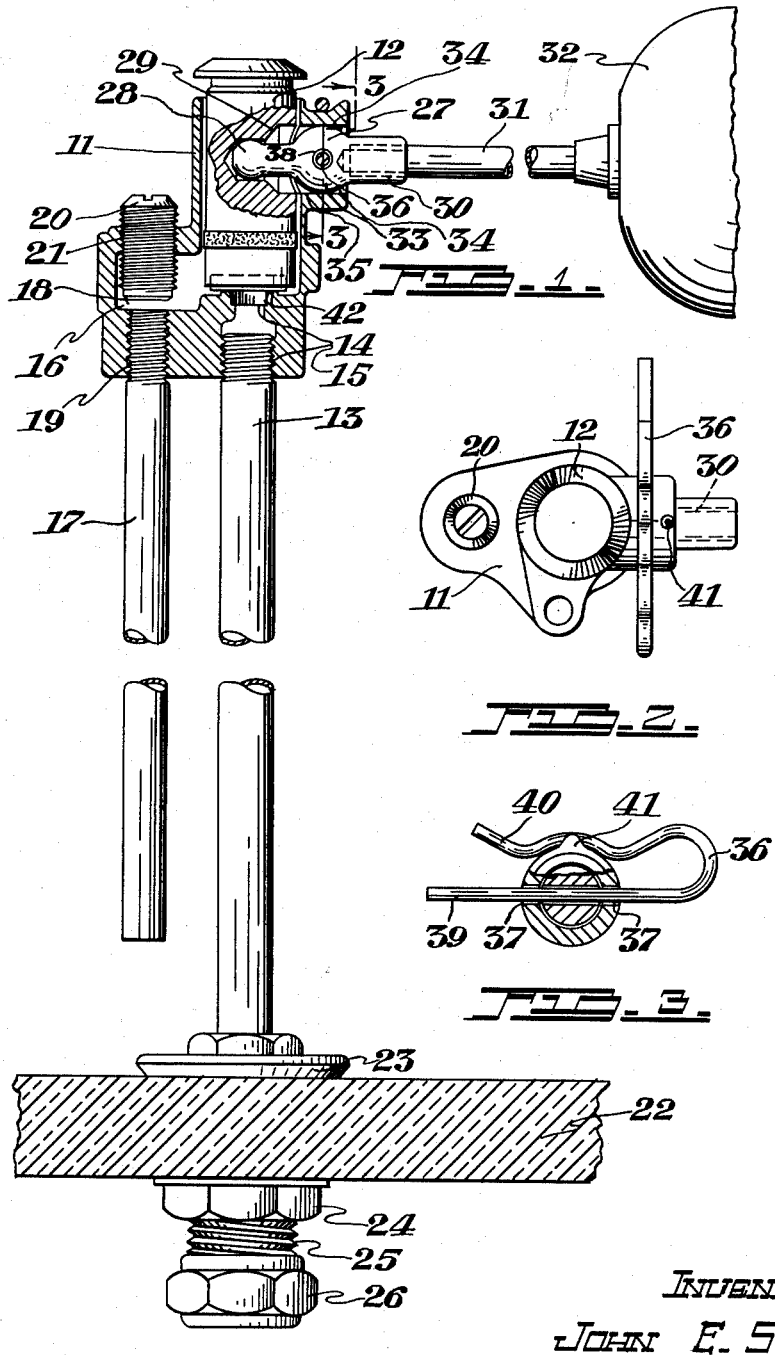
Inventor
John E. Stott
By Smart & Biggar
Attys.

United States Patent Office 2,720,215
Patented Oct. 11, 1955

2,720,215

LEVER ARM ASSEMBLY FOR FLOAT VALVES AND THE LIKE

John E. Stott, Wallaceburg, Ontario, Canada, assignor to Wallaceburg Brass Limited, Wallaceburg, Ontario, Canada, a corporation of Canada Application June 22, 1950, Serial No. 169,555

Claims priority, application Canada September 17, 1949

6 Claims. (Cl. 137—434)

My invention relates to a new lever mechanism for float valves and the like.

Hitherto single action levers used in float valves have had the disadvantage that they have been incapable of manufacture by automatic screw machines. Furthermore, the lever arms have been pivoted on stationary pins resulting in eventual failure of the parts due to wear. The installation of new parts has always been a difficulty and required special tools so that the installation requiring such new parts has been placed out of action for extended periods of time with great inconvenience, particularly to householders in houses containing only one bathroom.

It is accordingly the object of my invention to provide a single action lever for a float valve which is capable of manufacture by automatic screw machines.

It is also an object of my invention to provide a float valve lever arm assembly in which the pivoting takes place by virtue of a bulge on the lever arm rolling over a portion of the seating therefor, so that wear due to friction is greatly reduced.

It is a further object of my invention to provide a lever arm assembly for float valves and the like which is simple to assemble, has a long useful life, and in which parts may be replaced in a very simple manner without the use of special tools.

Various other objects and advantages of my invention will appear as the specification proceeds.

According to my invention there is provided a lever arm assembly for float valves and the like which includes a valve body having fulcrum seating means formed therein and a plunger arranged to be moved vertically within said body by means extending into a recess formed therein which comprises; a fulcrum housing extending radially from said valve body and having upper and lower bearing surfaces disposed therein; arm having a rounded bulge formed thereon, which bulge is designed to fit freely within said fulcrum housing, a portion adapted operatively to fit within the recess in said plunger to raise and lower the latter, the free end thereof being designed to connect to a float rod; and keeper pin means having a portion thereof adapted to pass through suitable holes in the sides of said fulcrum housing and through a horizontal hole formed within said bulge to retain the latter in seated position within said housing; said hole within said bulge being of substantially larger cross-section than said portion of said keeper pin means passing therethrough. The bulge on the arm is thus free to roll on either surface of the housing and the only function of the keeper pin is to prevent the inadvertant displacement of the bulge on the arm out of the seated position.

Preferably according to the invention the housing is formed by a radial extension of the valve body and the cross-section of the seat formed therein and the cross-section of the bulge on the arm are circular thereby to permit the manufacture of the fulcrum arm by means of an automatic screw machine or the like.

According to the invention the keeper pin means may be of any design which will retain the fulcrum arm in the seated position. I prefer, however, to have the keeper pin means consist of a substantially cotter-pin-shaped member as will be described hereinafter in greater detail, wherein preferably the portion which projects through the hole in the seating means and the hole in the bulge is substantially longer than the snap-over portion.

One embodiment of the invention will be described in greater detail in conjunction with the accompanying drawings in which, Figure 1 is a side elevation of the float valve according to the invention partly cut away to show the fulcrum arm assembly in section, Figure 2 is a detailed top plan view of the assembled device, and Figure 3 is a vertical section along the plane 3—3 of Figure 1.

Referring now more particularly to the drawings in the embodiment illustrated, a float valve provided with a lever arm assembly according to the invention comprises generally a valve body 11 suitably bored to accommodate the plunger 12 which controls entry of fluid through the inlet riser 13 which is screw-threaded into the inlet port 14 of the valve body 11 at 15. Fluid entering the valve body 11 when the plunger 12 is raised passes into the secondary cavity 16 within the valve body and down a silencer tube 17 which is screw-threaded into the outlet port 18 of the valve body at 19. Rate of flow of fluid through the valve when the plunger 12 is raised is controlled in any well known manner, for instance by the control screw 20 which is adapted into the valve body 11 above and coaxially with the silencer tube 17 as illustrated at 21.

The valve is mounted within a tank in any suitable manner and is shown as being mounted upon the bottom 22 of the tank by means of the rubber faced seat member 23 secured by the locking nut 24 which is freely mounted on the screw threaded portion 25 immediately above the coupling nut 26 which is designed to connect to the household water supply.

Raising and lowering of the plunger 12 is accomplished by means of the arm 27 which has a spherical end portion 28 thereon fitting operatively into the cavity 29 of the plunger 12. The free end of the arm is attached at 30 to the end of rigid float arm 31 having the float 32 fixed to the end thereof.

Arm 27 is formed with a rounded bulge 33 which is designed to fit freely within the radial extension 35 of the body 11. The arm is maintained in seated position by the keeper pin 36 which passes through holes 37 in the extension 35 of the body level and through the hole 38 in the arm 27. It will be noted, however, that the hole 38 in the bulge 33 of the arm 27 is of substantially greater cross-section than the portion 36 of the keeper pin passing therethrough. Thus the arm 27 does not pivot upon the keeper pin but the round portion 33 is free to establish rolling contact with the inner surface of the extension 35 of the valve body at 34' during raising of the float 32 or at 34 during lowering thereof and the slight axial motion of the fulcrum arm 27 which results is permitted to take place without restriction by the keeper pin 36. If desired the holes 37 in the valve body may also be of substantially greater cross-section than the portion of the keeper pin passing therethrough to permit a greater amount of play during operation.

The keeper pin 36 is formed of suitable spring metal and is substantially cotter-pin-shaped as will be appreciated by reference to Figure 3. The straight portion 39 thereof which passes through the arm and secures the latter in place is substantially longer than the snap-over portion 40 which is designed to snap-over the top of the extension 35 in the valve body 11. This permits the end of the portion 39 of the keeper pin to be inserted at least part way through the extension 35 and the arm 27 before the portion 40 contacts the outer surface of the extension 35 of the body 11 and facilitates assembly of the arm and valve body. A stud 41 is provided on the periphery of the extension 35 of the body 11 to retain the keeper pin and prevent movement thereof axially to the extension 35 of the body 11.

The action of the lever mechanism is as follows: when the tank is emptied of fluid, the float 32 will fall to the bottom thereof under its own weight and the bulge 33 will roll on the inner surface 34 of the extension 35 in the valve body 11 and the spherical end portion 28 of the lever arm will be raised carrying with it the plunger 12 raising it off the valve seat 42 and permitting fluid to flow up the riser 13, through the valve body, out the silencer tube 17, into the tank. As the water level in the tank rises, the float 32 is raised and the bulge 33 rolls on the surface 34', lowering the plunger 12 until, when the desired water level is reached, the plunger 12 is seated upon the seat 42 and further flow of water into the tank is prevented.

It will be seen from the above that the keeper pin 36 takes no part in the pivoting of the fulcrum lever 27 but merely tends to retain the lever within its seat against inadvertent dislodgement. Moreover, it will be appreciated that although in some cases the surface of the bulge 33 may slide over the inner surface 34 or 34' of the extension 35 in the valve body 11, the action will largely consist in the rolling together of these surfaces. Thus not only is all the bearing force and friction due to pivoting carried by the bulge portion of the lever arm but the total friction, and therefore the total wear, is greatly reduced because, as is well known, rolling friction is much less than sliding friction. Moreover, the keeper pin 36 is virtually free from all operative wear so that failure of this part will never occur and the assembly will operate smoothly and efficiently for an indefinite period of time.

What I claim as my invention is:

1. A lever arm assembly for float valves and the like comprising a valve body, a plunger having a recess therein and arranged to move vertically in the body, a fulcrum housing extending radially from said valve body and having a bearing surface disposed therein, an arm having a rounded bulge formed thereon, which bulge is designed to fit within said fulcrum housing, the arm having a portion thereof adapted to fit within the recess in said plunger, the arm being connected to a float rod, and keeper pin means having a portion thereof adapted to pass through suitable horizontal holes formed in the sides of said fulcrum housing and through a horizontal hole formed within the bulge in said arm, the hole within the bulge being of substantially larger cross-section than the portion of said keeper pin whereby the rounded bulge is free to establish rolling contact with the bearing surface during raising and lowering of said float.

2. A lever arm assembly as defined in claim 1 in which the fulcrum housing is circular in cross-section and said rounded bulge on said arm is circular in cross-section.

3. A lever arm assembly as defined in claim 2 in which said arm is circular in cross-section throughout the entire length thereof.

4. A lever arm assembly as defined in claim 1 in which said fulcrum housing is provided with at least one peripherally extending stud which forms a retaining means for said keeper pin means.

5. A lever arm assembly as defined in claim 1 in which said keeper pin means consists of a keeper pin formed from resilient metal and having a substantially straight portion designed to pass through said keeper pin holes to retain said arm in seated position, and a snap-over portion designed to snap into position over the top of said fulcrum housing, the over-all shape of said keeper pin being substantially similar to that of a cotter-pin.

6. A lever arm assembly as claimed in claim 5 in which the straight portion of said keeper pin is substantially longer than the snap-over portion thereof.

References Cited in the file of this patent

UNITED STATES PATENTS

| Number | Name | Date |
|---|---|---|
| 25,012 | Harris | Aug. 9, 1859 |
| 505,272 | Kelly | Sept. 19, 1893 |
| 590,558 | Jewett | Sept. 21, 1897 |
| 623,706 | Dillon | Apr. 25, 1899 |
| 723,698 | Marsh | Mar. 24, 1903 |
| 970,167 | Bellows | Sept. 13, 1910 |
| 1,027,965 | Young | May 28, 1912 |
| 1,140,377 | Johnson | May 25, 1915 |
| 1,255,389 | Cornelius | Feb. 5, 1918 |
| 1,295,789 | Pasman | Feb. 25, 1919 |
| 1,511,431 | Schossow | Oct. 14, 1924 |
| 1,526,738 | Brady | Feb. 17, 1925 |
| 1,550,029 | Johnson | Aug. 18, 1925 |
| 1,637,592 | Ryan | Aug. 2, 1927 |
| 1,641,756 | Haas | Sept. 6, 1927 |
| 2,027,978 | Hoff | Jan. 14, 1936 |
| 2,274,862 | Groeniger | Mar. 3, 1942 |
| 2,318,236 | Layton | May 4, 1943 |
| 2,587,032 | Delany et al. | Feb. 26, 1952 |
| 2,599,426 | Barling | June 3, 1952 |

FOREIGN PATENTS

| Number | Country | Date |
|---|---|---|
| 6,879 | Great Britain | June 5, 1885 |
| 103,507 | Sweden | 1942 |